(12) United States Patent
Gooding et al.

(10) Patent No.: US 10,552,297 B2
(45) Date of Patent: *Feb. 4, 2020

(54) DETERMINING INSTRUCTION EXECUTION HISTORY IN A DEBUGGER

(71) Applicant: International Business Machines Corporation, Armonk, NY (US)

(72) Inventors: Thomas M. Gooding, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,503

(22) Filed: May 17, 2019

(65) Prior Publication Data

US 2019/0272226 A1    Sep. 5, 2019

Related U.S. Application Data

(63) Continuation of application No. 14/088,030, filed on Nov. 22, 2013, now Pat. No. 10,372,590.

(51) Int. Cl.
*G06F 11/36* (2006.01)

(52) U.S. Cl.
CPC ........ *G06F 11/3656* (2013.01); *G06F 11/362* (2013.01)

(58) Field of Classification Search
CPC .......................... G06F 11/362; G06F 11/3656
See application file for complete search history.

(56) References Cited

U.S. PATENT DOCUMENTS

| | | |
|---|---|---|
| 5,790,828 A | 8/1998 | Jost |
| 6,356,960 B1 | 3/2002 | Jones et al. |
| 6,754,888 B1 | 6/2004 | Dryfoos et al. |
| 7,093,165 B2 | 8/2006 | Kageshima |
| 7,103,530 B1 | 9/2006 | Bartz et al. |
| 8,108,840 B2 | 1/2012 | Gritter et al. |
| 8,332,587 B2 | 12/2012 | Luick |
| 8,589,738 B2 | 11/2013 | Moyer et al. |
| 8,850,394 B2 | 9/2014 | Edwards |
| 2002/0073400 A1 | 6/2002 | Beuten et al. |
| 2002/0087949 A1 | 7/2002 | Golender et al. |
| 2002/0104078 A1 | 8/2002 | Shann et al. |
| 2003/0110476 A1 | 6/2003 | Aihara |
| 2003/0142146 A1 | 7/2003 | Al-Azzawe et al. |
| 2004/0111708 A1 | 6/2004 | Calder et al. |
| 2005/0033542 A1* | 2/2005 | Morikawa ........... G06F 11/3636 702/118 |
| 2005/0033553 A1* | 2/2005 | Swaine ............... G06F 11/3476 702/176 |
| 2005/0138484 A1 | 6/2005 | Moyer et al. |
| 2005/0273559 A1 | 12/2005 | Aristodemou et al. |

(Continued)

*Primary Examiner* — Chat C Do
*Assistant Examiner* — Douglas M Slachta
(74) *Attorney, Agent, or Firm* — Bryan Bortnick

(57) ABSTRACT

Determining instruction execution history in a debugger, including: retrieving, from an instruction cache, cache data that includes an age value for each cache line in the instruction cache; sorting, by the age value for each cache line, entries in the instruction cache; retrieving, using an address contained in each cache line, one or more instructions associated with the address contained in each cache line; and displaying the one or more instructions.

12 Claims, 4 Drawing Sheets

(56) References Cited

U.S. PATENT DOCUMENTS

| | | | |
|---|---|---|---|
| 2006/0117229 A1* | 6/2006 | Swaine | G06F 11/348 |
| | | | 714/45 |
| 2006/0230390 A1 | 10/2006 | Alexander, III et al. | |
| 2006/0271919 A1 | 11/2006 | Moyer | |
| 2007/0234294 A1 | 10/2007 | Gooding | |
| 2007/0261033 A1 | 11/2007 | Chen et al. | |
| 2008/0082720 A1 | 4/2008 | Moyer | |
| 2008/0109644 A1 | 5/2008 | Stempel et al. | |
| 2008/0155342 A1* | 6/2008 | O'Callahan | G06F 11/3636 |
| | | | 714/38.14 |
| 2008/0201613 A1 | 8/2008 | Drepper | |
| 2008/0301378 A1* | 12/2008 | Carrie | G06F 9/3004 |
| | | | 711/147 |
| 2009/0038001 A1 | 2/2009 | Bozak et al. | |
| 2009/0100224 A1 | 4/2009 | Wang | |
| 2009/0249302 A1 | 10/2009 | Xu et al. | |
| 2009/0282294 A1 | 11/2009 | Edwards | |
| 2009/0313001 A1 | 12/2009 | Kato et al. | |
| 2009/0319994 A1* | 12/2009 | Oda | G06F 11/3648 |
| | | | 717/124 |
| 2010/0205377 A1 | 8/2010 | Moyer | |
| 2010/0318972 A1 | 12/2010 | Xu et al. | |
| 2011/0016289 A1 | 1/2011 | Ableidinger | |
| 2011/0099538 A1 | 4/2011 | Naidu Pujala et al. | |
| 2011/0113291 A1 | 5/2011 | Ike | |
| 2011/0258421 A1* | 10/2011 | Elnozahy | G06F 11/3636 |
| | | | 712/227 |
| 2012/0173825 A1 | 7/2012 | Ehrlich et al. | |
| 2012/0185734 A1* | 7/2012 | Gilkerson | G06F 9/30072 |
| | | | 714/45 |
| 2012/0311540 A1 | 12/2012 | Fanning et al. | |
| 2013/0036254 A1 | 2/2013 | Fai et al. | |
| 2013/0339610 A1 | 12/2013 | Collura et al. | |
| 2014/0068344 A1 | 3/2014 | Miller | |
| 2014/0173570 A1* | 6/2014 | Martineau | G06F 11/362 |
| | | | 717/125 |
| 2014/0344556 A1* | 11/2014 | Bartnikowski | G06F 11/30 |
| | | | 712/227 |
| 2015/0149984 A1 | 5/2015 | Gooding et al. | |

* cited by examiner

US 10,552,297 B2

DETERMINING INSTRUCTION EXECUTION HISTORY IN A DEBUGGER

CROSS-REFERENCE TO RELATED APPLICATION

This application is a continuation application of and claims priority from U.S. patent application Ser. No. 14/088,030, filed Nov. 22, 2013.

BACKGROUND OF THE INVENTION

Field of the Invention

The field of the invention is data processing, or, more specifically, methods, apparatus, and products for determining instruction execution history in a debugger.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The operation of software applications deployed on modern computing systems can be accessed and analyzed through the use of debuggers and other profiling tools. Debuggers and other profiling tools that analyze program performance and code flow often rely on periodic sampling of program flow. For periodic sampling, the profiler will gather the instruction address or stack traceback on each periodic timer tick. This methodology, however, provides a limited view of program activity as no context is presented to a user identifying how the execution of a program arrived at a given point.

SUMMARY OF THE INVENTION

Methods, apparatuses, and products for determining instruction execution history in a debugger, including: retrieving, from an instruction cache, cache data that includes an age value for each cache line in the instruction cache; sorting, by the age value for each cache line, entries in the instruction cache; retrieving, using an address contained in each cache line, one or more instructions associated with the address contained in each cache line; and displaying the one or more instructions.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
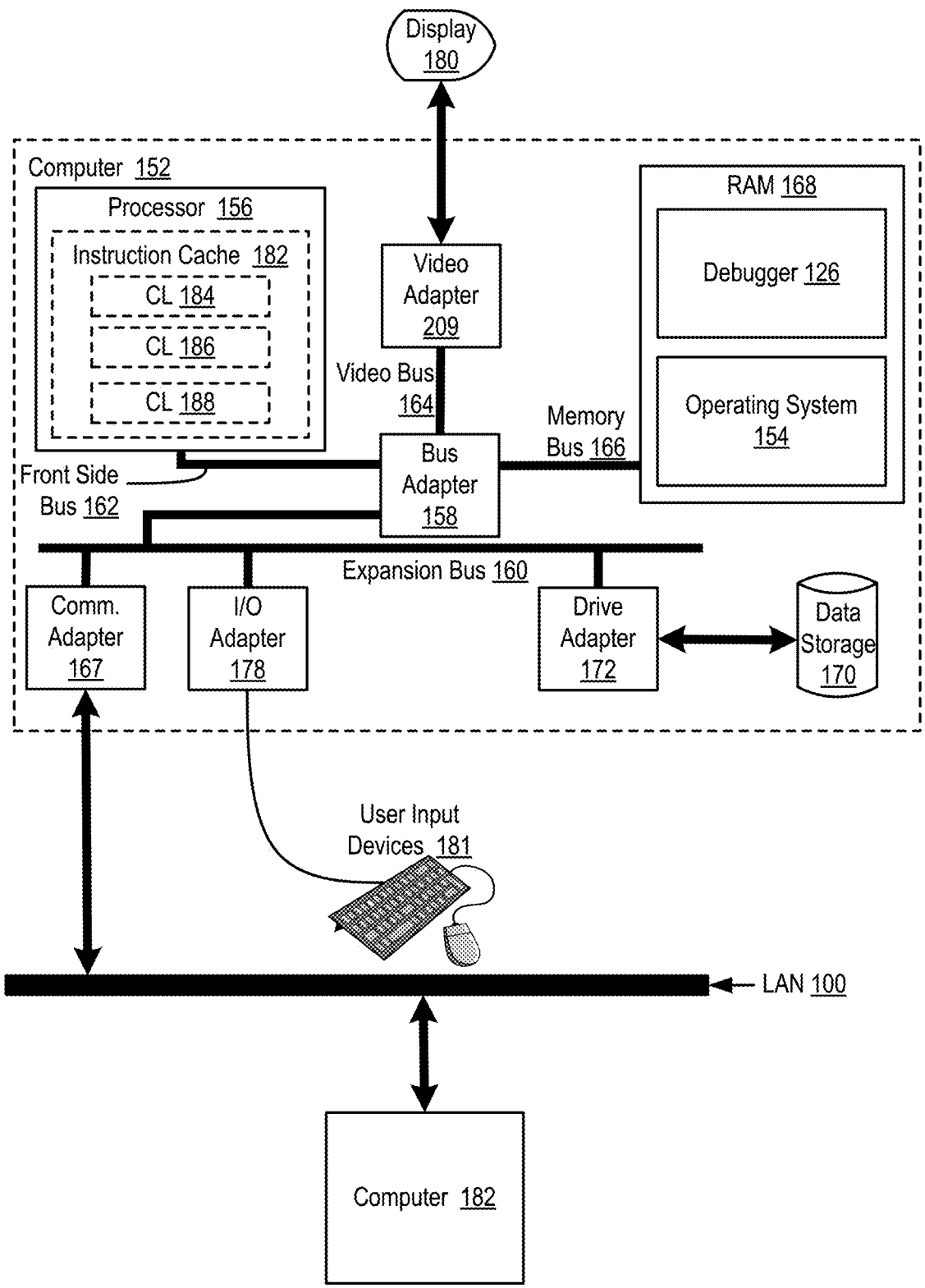
FIG. 1 sets forth a block diagram of automated computing machinery comprising an example computer useful in determining instruction execution history in a debugger according to embodiments of the present invention.

Example methods, apparatuses, and products for determining instruction execution history in a debugger in accordance with the present invention are described with reference to the accompanying drawings, beginning with FIG. 1. FIG. 1 sets forth a block diagram of automated computing machinery comprising an example computer (152) useful in determining instruction execution history in a debugger (126) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a debugger (126). The debugger (126) in the example method of FIG. 1 represents a computer program that is used to interrogate the state of other computer programs. The term debugger, as it is used herein, refers to any computer program that is used to interrogate the state of other computer programs. Although the debugger (126) of FIG. 1 is depicted as residing on a single computer (152), readers will appreciate that the debugger (126) may also be embodied as distributed debugger in which portions of the debugger (126) execute on a plurality of compute nodes and in which the debugger (126) debugs portions of computer programs distributed across multiple compute nodes.

In the example of FIG. 1, the computer (152) includes an instruction cache (182) with a plurality of cache lines (184, 186, 188). The instruction cache (182) of FIG. 1 may be embodied, for example, as memory that resides on a processor (156) such as a CPU. The instruction cache (182) of FIG. 1 may include recently executed instructions, such that a subsequent access of a recently executed instruction can result in much faster instruction fetches than would be required to fetch an instruction from main memory or a hard disk. In the example of FIG. 1, the instruction cache (182) may be segmented into a plurality of cache lines (184, 186, 188) representing the size of each entry in the instruction cache (182). In such an example, the CPU may include other caches such as a data cache for storing frequently accessed data as well as a translation lookaside buffer ('TLB') used to speed up virtual-to-physical address translation for both executable instructions and data.

The debugger (126) of FIG. 1 determines an instruction execution history by retrieving, from the instruction cache (182), cache data that includes an age value for each cache line (184, 186, 188) in the instruction cache (182). In the example of FIG. 1, each cache line (184, 186, 188) in the instruction cache (182) may include information identifying the time at which an instruction in the cache line (184, 186, 188) was last executed. The information identifying the time at which an instruction in the cache line (184, 186, 188) was last executed may be embodied, for example, as an absolute timestamp (e.g., 11:42:15), as a relative time stamp (e.g., last 30 seconds), as a number of processor cycles since the instruction was executed, as a number of additional instructions that have executed since the instruction was executed, and so on. In such an example, retrieving cache data that includes an age value for each cache line (184, 186, 188) in the instruction cache (182) may therefore be carried out by reading the portion of the cache line (184, 186, 188) that includes the age value for each cache line (184, 186, 188).

The debugger (126) of FIG. 1 further determines an instruction execution history by sorting, in dependence upon the age value for each cache line (184, 186, 188), entries in the instruction cache (182). In the example of FIG. 1, sorting entries in the instruction cache (182) in dependence upon the age value for each cache line (184, 186, 188) may be carried out by sorting each entry in the instruction cache (182) based on the information identifying the time at which an instruction in the cache line (184, 186, 188) was last executed. In such a way, the instructions that were most recently executed may float towards the top of the sorted list of entries in the instruction cache (182) and the instructions that were least recently executed may float towards the bottom of the sorted list of entries in the instruction cache (182), such that a sequence can be generated that identifies the order in which the instructions were executed.

The debugger (126) of FIG. 1 further determines an instruction execution history by retrieving, using the address contained in each cache line (184, 186, 188), one or more instructions associated with the address contained in each cache line (184, 186, 188). In the example of FIG. 1, retrieving the one or more instructions associated with the address contained in each cache line (184, 186, 188) may be carried out, for example, by retrieving an instruction stored at the address contained in a particular cache line (184, 186, 188). In such an example, the instruction stored at the address contained in a particular cache line (184, 186, 188) may be embodied as an assembly language instruction, as an instruction developed in a higher language programming language, and so on. In such an example, the address contained in each cache line (184, 186, 188) may be embodied as a virtual address in a virtual memory space such that retrieving one or more instructions associated with the address contained in each cache line (184, 186, 188) may be carried out by translating the virtual address contained in each cache line (184, 186, 188) to a physical address and retrieving the instruction contained at the physical address in memory.

The debugger (126) of FIG. 1 further determines an instruction execution history by displaying the one or more instructions. In the example of FIG. 1, displaying the one or more instructions may be carried out, for example, by displaying the one or more instructions in a graphical user interface (GUI') presented to a user via the display (180). In the example of FIG. 1, the one or more instructions—having been sorted based on the age value for each cache line (184, 186, 188)—may be displayed such that a history of executed instructions may be presented to a system administrator or other user to understand the sequence of executed instructions that have led to the current state of a program's execution.

Also stored in RAM (168) is an operating system (154). Operating systems useful determining instruction execution history in a debugger according to embodiments of the present invention include UNIX®, Linux™, Microsoft XP™, AIX™, IBM's i5/OS™, and others as will occur to those of skill in the art. The operating system (154) and the debugger (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for determining instruction execution history in a debugger according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for determining instruction execution history in a debugger according to embodiments of the present invention include modems for wired dial-up communications, Ethernet (IEEE 802.3) adapters for wired data communications network communications, and 802.11 adapters for wireless data communications network communications.

Figure 2:
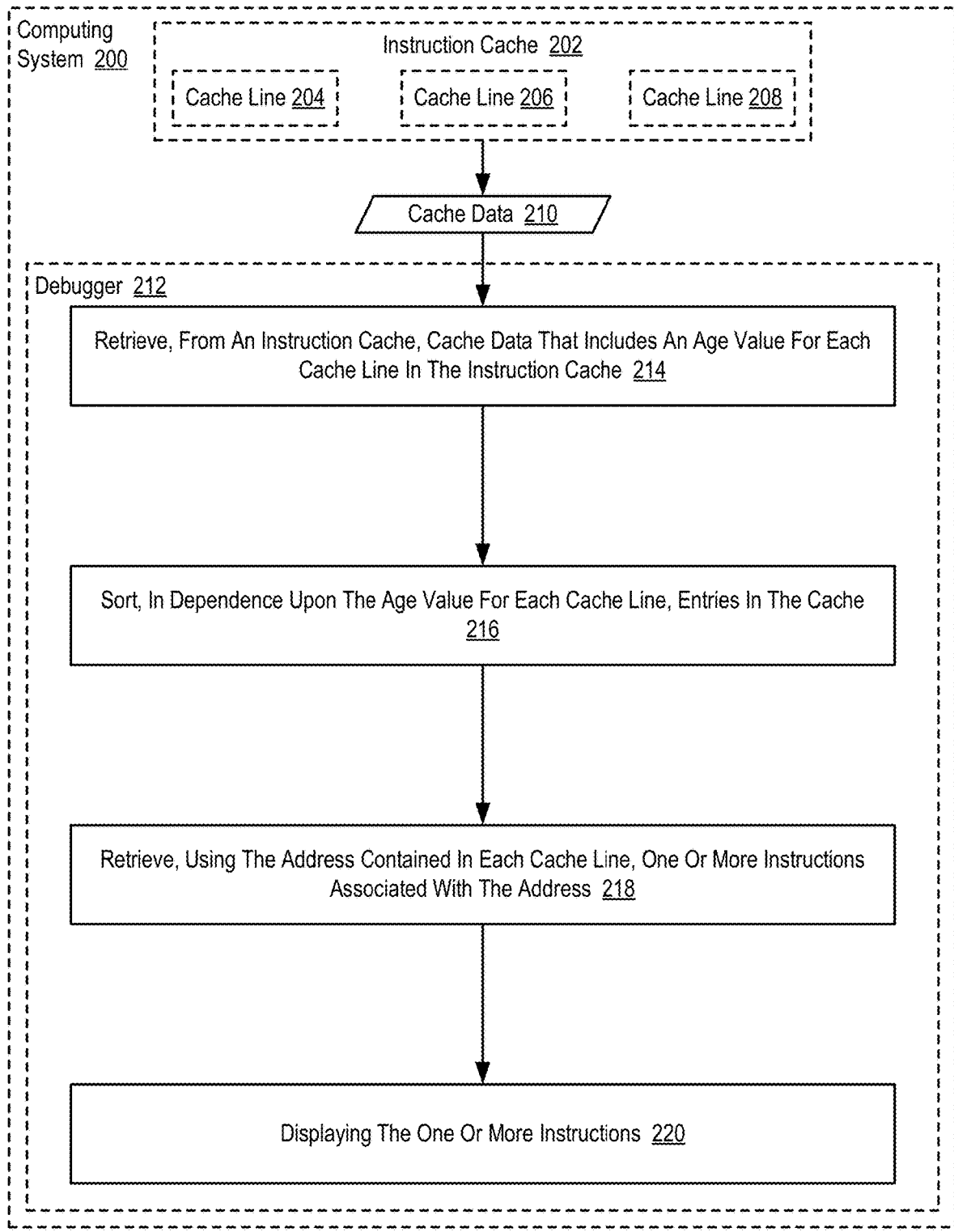
FIG. 2 sets forth a flow chart illustrating an example method for determining instruction execution history in a debugger according to embodiments of the present invention.

For further explanation, FIG. 2 sets forth a flow chart illustrating an example method for determining instruction execution history in a debugger (212) according to embodiments of the present invention. The debugger (212) in the example method of FIG. 2 represents a computer program that is used to test and debug other computer programs. Although the debugger (212) of FIG. 2 is depicted as residing on a single computing system (200), readers will appreciate that the debugger (212) may also be embodied as distributed debugger in which portions of the debugger (212) execute on a plurality of compute nodes and in which the debugger (212) debugs portions of computer programs distributed across multiple compute nodes.

In the example method of FIG. 2, the computing system (200) includes an instruction cache (202) with a plurality of cache lines (204, 206, 208). The instruction cache (202) of FIG. 2 may be embodied, for example, as memory that resides on a processor such as a CPU. The instruction cache (202) of FIG. 2 may include recently executed instructions, such that a subsequent access of a recently executed instruction can result in much faster instruction fetches than would be required to fetch an instruction from main memory or a hard disk. In the example method of FIG. 2, the instruction cache (202) may be segmented into a plurality of cache lines (204, 206, 208) representing the size of each entry in the instruction cache (202). In such an example, the CPU may include other caches such as a data cache for storing frequently accessed data as well as a translation lookaside buffer ('TLB') used to speed up virtual-to-physical address translation for both executable instructions and data.

The example method of FIG. 2 includes retrieving (214), from an instruction cache (202), cache data (210) that includes an age value for each cache line (204, 206, 208) in the instruction cache (202). In the example method of FIG. 2, each cache line (204, 206, 208) in the instruction cache (202) may include information identifying the time at which an instruction in the cache line (204, 206, 208) was last executed. The information identifying the time at which an instruction in the cache line (204, 206, 208) was last executed may be embodied, for example, as an absolute timestamp (e.g., 11:42:15), as a relative time stamp (e.g., last 30 seconds), as a number of processor cycles since the instruction was executed, as a number of additional instructions that have executed since the instruction was executed, and so on. In such an example, retrieving (214) cache data (210) that includes an age value for each cache line (204, 206, 208) in the instruction cache (202) may therefore be carried out by reading the portion of the cache line (204, 206, 208) that includes the age value for each cache line (204, 206, 208).

The example method of FIG. 2 also includes sorting (216), in dependence upon the age value for each cache line (204, 206, 208), entries in the instruction cache (202). In the example method of FIG. 2, sorting (216) entries in the instruction cache (202) in dependence upon the age value for each cache line (204, 206, 208) may be carried out by sorting each entry in the instruction cache (202) based on the information identifying the time at which an instruction in the cache line (204, 206, 208) was last executed. In such a way, the instructions that were most recently executed may float towards the top of the sorted list of entries in the instruction cache (202) and the instructions that were least recently executed may float towards the bottom of the sorted list of entries in the instruction cache (202), such that a sequence can be generated that identifies the order in which the instructions were executed.

The example method of FIG. 2 also includes retrieving (218), using the address contained in each cache line (204, 206, 208), one or more instructions associated with the address contained in each cache line (204, 206, 208). In the example method of FIG. 2, retrieving (218) the one or more instructions associated with the address contained in each cache line (204, 206, 208) may be carried out, for example, by retrieving an instruction stored at the address contained in a particular cache line (204, 206, 208). In such an example, the instruction stored at the address contained in a particular cache line (204, 206, 208) may be embodied as an assembly language instruction, as an instruction developed in a higher language programming language, and so on. In such an example, the address contained in each cache line (204, 206, 208) may be embodied as a virtual address in a virtual memory space such that retrieving (218) one or more instructions associated with the address contained in each cache line (204, 206, 208) may be carried out by translating the virtual address contained in each cache line (204, 206, 208) to a physical address and retrieving the instruction contained at the physical address in memory.

The example method of FIG. 2 also includes displaying (220) the one or more instructions. In the example method of FIG. 2, displaying (220) the one or more instructions may be carried out, for example, by displaying (220) the one or more instructions in a graphical user interface (GUI') presented to a user. In the example method of FIG. 2, the one or more instructions—having been sorted (216) based on the age value for each cache line (204, 206, 208)—may be displayed such that a history of executed instructions may be presented to a system administrator or other user to understand the sequence of executed instructions that have led to the current state of the program's execution.

Figure 3:
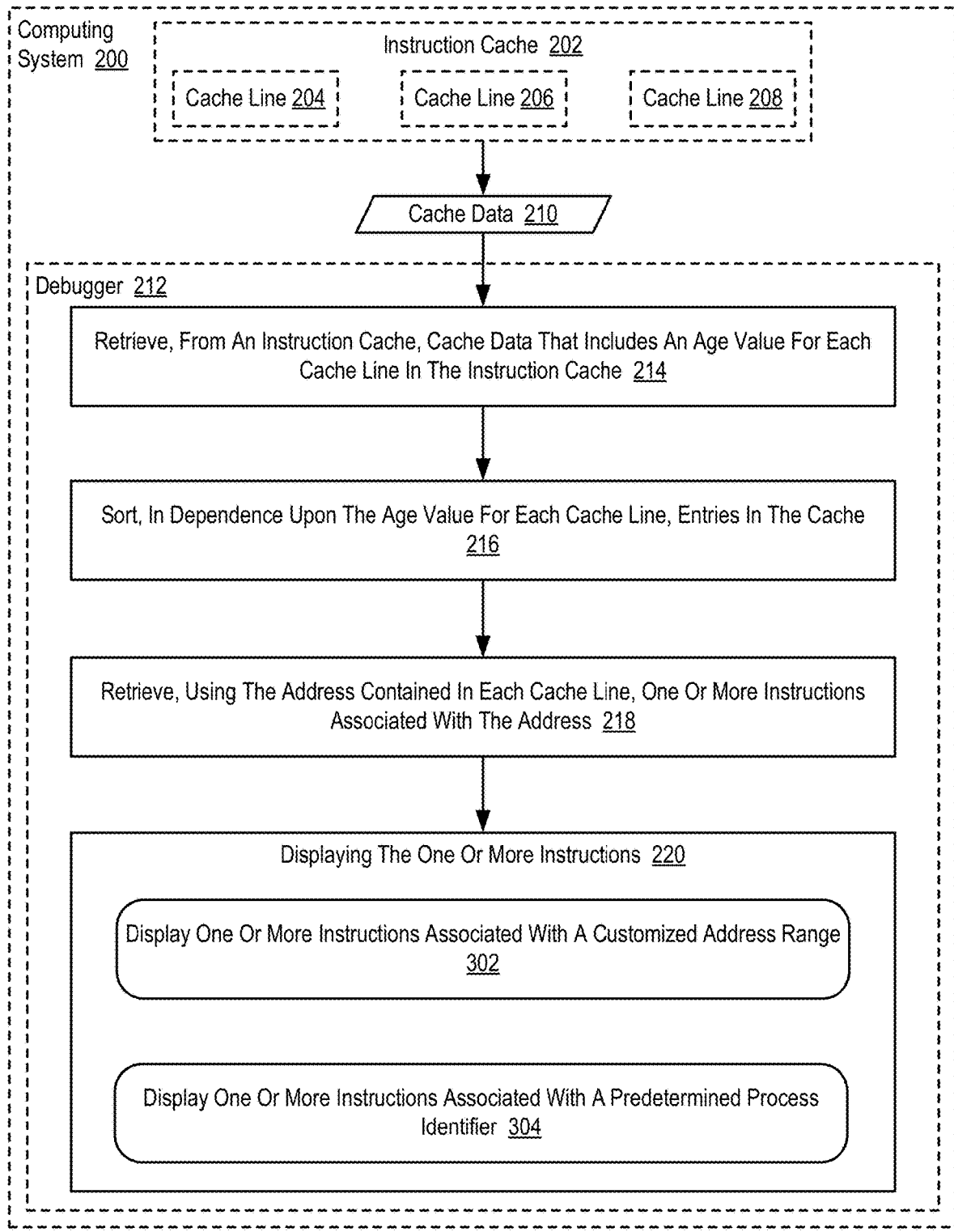
FIG. 3 sets forth a flow chart illustrating an additional example method for determining instruction execution history in a debugger according to embodiments of the present invention.

For further explanation, FIG. 3 sets forth a flow chart illustrating an additional example method for determining instruction execution history in a debugger (212) according to embodiments of the present invention. The method of FIG. 3 is similar to method of FIG. 2, as it also includes retrieving (214) cache data (210) that includes an age value for each cache line (204, 206, 208) in the instruction cache (202), sorting (216) entries in the instruction cache (202), retrieving (218) one or more instructions associated with the address contained in each cache line (204, 206, 208), and displaying (220) the one or more instructions.

In the example method of FIG. 3, displaying (220) the one or more instructions may include displaying (302) one or more instructions associated with a customized address range. In the example method of FIG. 3, the customized address range may be established by a system administrator or other user to limit the instructions that are displayed (302) for viewing by the system administrator or other user. In such an example, instructions contained at an address that is outside of the customized address range may not be displayed (302) for viewing by the system administrator or other user, thereby enabling the system administrator or other user to limit their focus when reviewing a sequence of instructions that have been previously executed.

In the example method of FIG. 3, displaying (220) the one or more instructions may alternatively include displaying (304) one or more instructions associated with a predetermined process identifier. In the example method of FIG. 3, multiple processes may be executing over a period of time such that the entries in the instruction cache (202) include instructions that were executed by a plurality of processes. In such an example, a system administrator or other user that is viewing a history of executed instructions may desire to restrict the instructions that are displayed (304) to only include instructions that were executed as part of carrying out a particular process. As such, the system administrator or other user that is viewing a history of executed instructions may designate a predetermined process identifier associated with a particular process of interest, such that only the one or more instructions that are associated with a predetermined process identifier are displayed (304). In the example method of FIG. 3, in order to displaying (304) one or more instructions associated with a predetermined process identifier, the instruction cache (202) and the cache data (210) may include an identifier of the process that executed a particular instruction contained within a particular cache line (204, 206, 208).

Figure 4:
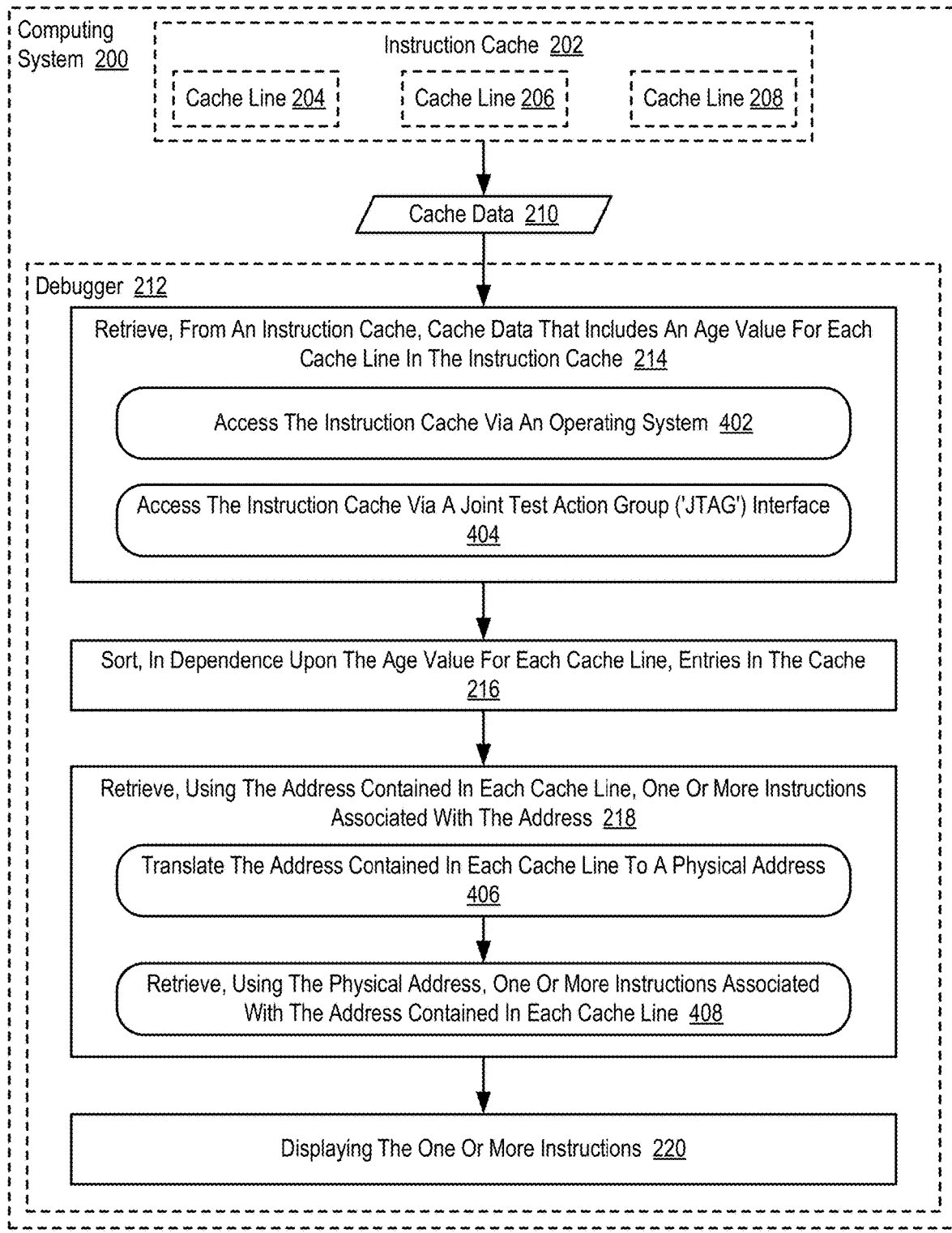
FIG. 4 sets forth a flow chart illustrating an additional example method for determining instruction execution history in a debugger according to embodiments of the present invention.

For further explanation, FIG. 4 sets forth a flow chart illustrating an additional example method for determining instruction execution history in a debugger (212) according to embodiments of the present invention. The method of FIG. 4 is similar to method of FIG. 2, as it also includes retrieving (214) cache data (210) that includes an age value for each cache line (204, 206, 208) in the instruction cache (202), sorting (216) entries in the instruction cache (202), retrieving (218) one or more instructions associated with the address contained in each cache line (204, 206, 208), and displaying (220) the one or more instructions.

In the example method of FIG. 4, retrieving (214) cache data (210) that includes an age value for each cache line (204, 206, 208) in the instruction cache (202) can include accessing (402) the instruction cache (202) via a Joint Test Action Group ('JTAG') interface. JTAG is the common name for the IEEE 1149.1 Standard Test Access Port and Boundary-Scan Architecture that was originally devised for testing printed circuit boards using boundary scan. Modern processors implement JTAG through the use of dedicated pins on the processor. In the example method of FIG. 4, the JTAG interface can include a special four-pin (or optionally five-pin) interface added to a processor that includes the instruction cache (202). The pins can include a Test Data In ('TDI') pin, a Test Data Out ('TDO') pin, a Test Clock ('TCK') pin, a Test Mode Select ('TMS') pin, and an optional Test Reset ('TRST') pin. To use JTAG, a host is connected to the processor's JTAG pins through a JTAG adapter that connects to the host using some interface such as USB, PCI, Ethernet, and so on. In such an example, a supported set of commands may be utilized by manipulating the TMS pin and the TDI pin in conjunction with the TCK pin, then reading results through the TDO pin. Such commands may include a command to read data contained in memory, such as the instruction cache (202). In such a way, the debugger (212) may issue commands through the JTAG interface via a JTAG adapter to access (402) the instruction cache (202) and read the cache data (210) from the instruction cache (202).

In the example method of FIG. 4, retrieving (214) cache data (210) that includes an age value for each cache line (204, 206, 208) in the instruction cache (202) can alternatively include accessing (404) the instruction cache (202) via an operating system. In the example method of FIG. 4, an operating system executing on the computing system (200) may include mechanisms for accessing an instruction cache (202) such as an on-chip CPU instruction cache. Accessing (404) the instruction cache (202) via an operating system may therefore be carried out, for example, by the debugger (212) making a call to an operating system requesting cache data (210) from the instruction cache (202).

In the example method of FIG. 4, retrieving (218) one or more instructions associated with the address contained in each cache line (204, 206, 208) can include translating (406) the address contained in each cache line to a physical address. In the example method of FIG. 4, the address contained in each cache line (204, 206, 208) may be embodied as a virtual address in virtual memory. In such an example, translating (406) such a virtual address contained in each cache line (204, 206, 208) to a physical address may be carried out through the use of a page table or other data structure that associates virtual memory addresses with physical memory addresses. By looking up the virtual address contained in each cache line (204, 206, 208) in a page table, the debugger (212) may identify a physical address associated with the virtual address contained in each cache line (204, 206, 208). In such a way, retrieving (218) one or more instructions associated with the address contained in each cache line (204, 206, 208) can also therefore include retrieving (408), using the physical address, one or more instructions associated with the address contained in each cache line by retrieving one or more instructions stored at the physical address in physical memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for determining instruction execution history in a debugger, the method comprising:
    retrieving, by the debugger from an instruction cache, instruction cache data that includes one or more process identifiers associated with respective executed processes and an age value for each cache line in the instruction cache, wherein the age value includes information identifying a time at which an instruction in the cache line was last executed, wherein the information includes at least one of an absolute timestamp, a relative time stamp, a number of processor cycles since the instruction was executed, and a number of additional instructions that have executed since the instruction was executed;
    sorting, by the debugger in dependence upon the age value for each cache line, entries in the instruction cache;
    retrieving, by the debugger using an address contained in each cache line, a plurality of instructions associated with the address contained in each cache line; and
    displaying, by the debugger, the plurality of instructions, wherein displaying the plurality of instructions includes:
        receiving a user-determined customized address range and a user designation of a specific process identifier of the one or more process identifiers, the specific process identifier associated with a particular process;
        filtering the plurality of instructions based on the specific process identifier to identify a set of instructions that were executed as part of carrying out the particular process; and displaying a limited subset of the set of instructions identified from the filtering without displaying remaining instructions of the plurality of instructions, wherein displaying the limited subset includes displaying only instructions associated with the customized address range.

2. The method of claim 1 wherein retrieving, by the debugger from an instruction cache, cache data that includes an age value for each cache line in the instruction cache further comprises accessing the instruction cache via a Joint Test Action Group ('JTAG') interface.

3. The method of claim 1 wherein retrieving, by the debugger from an instruction cache, cache data that includes an age value for each cache line in the instruction cache further comprises accessing the instruction cache via an operating system.

4. The method of claim 1 wherein retrieving, by the debugger using an address contained in each cache line, the plurality of instructions associated with the address contained in each cache line further comprises:
    translating the address contained in each cache line to a physical address; and
    retrieving, using the physical address, one or more instructions associated with the address contained in each cache line.

5. An apparatus for determining instruction execution history in a debugger, the apparatus comprising a computer processor, a computer memory operatively coupled to the computer processor, the computer memory having disposed within it computer program instructions that, when executed by the computer processor, cause the apparatus to carry out the steps of:
    retrieving, by the debugger from an instruction cache, instruction cache data that includes one or more process identifiers associated with respective executed processes and an age value for each cache line in the instruction cache, wherein the age value includes information identifying a time at which an instruction in the cache line was last executed, wherein the information includes at least one of an absolute timestamp, a relative time stamp, a number of processor cycles since the instruction was executed, and a number of additional instructions that have executed since the instruction was executed;

sorting, by the debugger in dependence upon the age value for each cache line, entries in the instruction cache;

retrieving, by the debugger using an address contained in each cache line, a plurality of instructions associated with the address contained in each cache line; and displaying, by the debugger, the plurality of instructions, wherein displaying the plurality of instructions includes:

receiving a user-determined customized address range and a user designation of a specific process identifier of the one or more process identifiers, the specific process identifier associated with a particular process;

filtering the plurality of instructions based on the specific process identifier to identify a set of instructions that were executed as part of carrying out the particular process; and displaying a limited subset of the set of instructions identified from the filtering without displaying remaining instructions of the plurality of instructions, wherein displaying the limited subset includes displaying only instructions associated with the customized address range.

6. The apparatus of claim 5 wherein retrieving, by the debugger from an instruction cache, cache data that includes an age value for each cache line in the instruction cache further comprises accessing the instruction cache via a Joint Test Action Group ('JTAG') interface.

7. The apparatus of claim 5 wherein retrieving, by the debugger from an instruction cache, cache data that includes an age value for each cache line in the instruction cache further comprises accessing the instruction cache via an operating system.

8. The apparatus of claim 5 wherein retrieving, by the debugger using an address contained in each cache line, the plurality of instructions associated with the address contained in each cache line further comprises:

translating the address contained in each cache line to a physical address; and retrieving, using the physical address, one or more instructions associated with the address contained in each cache line.

9. A computer program product for determining instruction execution history in a debugger, the computer program product disposed upon a computer readable storage medium, the computer program product comprising computer program instructions that, when executed, cause a computer to carry out the steps of:

retrieving, by the debugger from an instruction cache, instruction cache data that includes one or more process identifiers associated with respective executed processes and an age value for each cache line in the instruction cache, wherein the age value includes information identifying a time at which an instruction in the cache line was last executed, wherein the information includes at least one of an absolute timestamp, a relative time stamp, a number of processor cycles since the instruction was executed, and a number of additional instructions that have executed since the instruction was executed;

sorting, by the debugger in dependence upon the age value for each cache line, entries in the instruction cache;

retrieving, by the debugger using an address contained in each cache line, a plurality of instructions associated with the address contained in each cache line; and displaying, by the debugger, the plurality of instructions, wherein displaying the plurality of instructions includes:

receiving a user-determined customized address range and a user designation of a specific process identifier of the one or more process identifiers, the specific process identifier associated with a particular process;

filtering the plurality of instructions based on the specific process identifier to identify a set of instructions that were executed as part of carrying out the particular process; and displaying a limited subset of the set of instructions identified from the filtering without displaying remaining instructions of the plurality of instructions, wherein displaying the limited subset includes displaying only instructions associated with the customized address range.

10. The computer program product of claim 9 wherein retrieving, by the debugger from an instruction cache, cache data that includes an age value for each cache line in the instruction cache further comprises accessing the instruction cache via a Joint Test Action Group ('JTAG') interface.

11. The computer program product of claim 9 wherein retrieving, by the debugger from an instruction cache, cache data that includes an age value for each cache line in the instruction cache further comprises accessing the instruction cache via an operating system.

12. The computer program product of claim 9 wherein retrieving, by the debugger using an address contained in each cache line, the plurality of instructions associated with the address contained in each cache line further comprises:

translating the address contained in each cache line to a physical address; and retrieving, using the physical address, one or more instructions associated with the address contained in each cache line.

* * * * *